(12) United States Patent
Miyagoe

(10) Patent No.: US 7,332,831 B2
(45) Date of Patent: Feb. 19, 2008

(54) POWER SUPPLY APPARATUS WITH SOFT START CONTROL

(75) Inventor: Yasuhiro Miyagoe, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 11/387,631

(22) Filed: Mar. 23, 2006

(65) Prior Publication Data

US 2006/0170290 A1 Aug. 3, 2006

Related U.S. Application Data

(63) Continuation of application No. PCT/JP2004/017414, filed on Nov. 24, 2004.

(30) Foreign Application Priority Data

Dec. 22, 2003 (JP) .............................. 2003-424455
Nov. 10, 2004 (JP) .............................. 2004-326320

(51) Int. Cl.
*H02J 1/10* (2006.01)
*H02J 3/38* (2006.01)
*H02J 7/34* (2006.01)

(52) U.S. Cl. .......................................... 307/18; 307/82
(58) Field of Classification Search .................. 307/18, 307/82
See application file for complete search history.

(56) References Cited

U.S. PATENT DOCUMENTS 6,515,880 B1 * 2/2003 Evans et al. .................. 363/49
7,105,947 B1 * 9/2006 Marshall et al. ............... 307/28

FOREIGN PATENT DOCUMENTS

| JP | 09-327125 | 12/1997 |
|---|---|---|
| JP | 10-164825 | 6/1998 |
| JP | 2002-078335 | 3/2002 |
| JP | 2003-189579 | 7/2003 |
| JP | 2003-189597 | 7/2003 |

OTHER PUBLICATIONS

International Search Report for International application No. PCT/JP2004/017414 mailed Mar. 15 2005.
Manual of "HDD system power supply BD9786KN", Oct. 23, 2001, pp. 1-17.
International Preliminary Report on Patentability for International Application No. PCT/JP2004/017414 with English translation mailed Aug. 3, 2006.

* cited by examiner

*Primary Examiner*—Michael Sherry
*Assistant Examiner*—Carlos Amaya
(74) *Attorney, Agent, or Firm*—Cantor Colburn LLP

(57) ABSTRACT

A power supply apparatus includes a plurality of power supply circuits, switches connected to the power supply circuits, a common soft start circuit and an individual soft start circuit commonly connected to the plurality of power supply circuits via the switches. The power supply circuits are commonly connected to the common soft start circuit at power-on or power-off so as to perform common soft start by the common soft start circuit. When a voltage from any of the plurality of power supply circuits is caused to make a transition individually, the associated power supply circuit is connected to the individual soft start circuit so as to perform soft start by the individual soft start circuit.

14 Claims, 12 Drawing Sheets

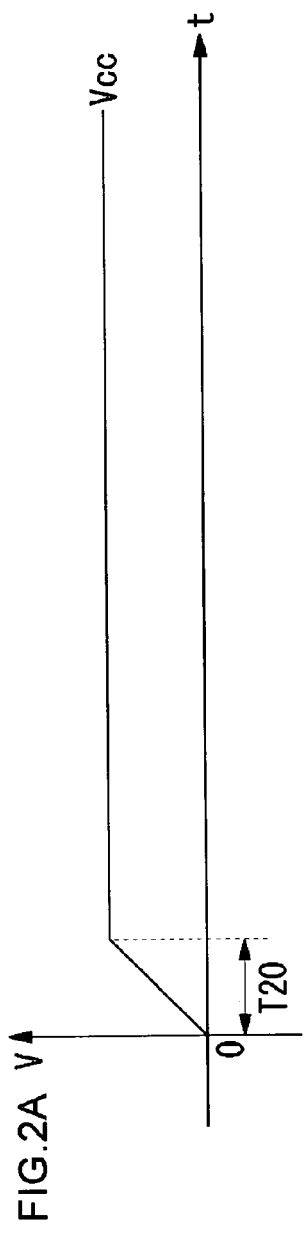
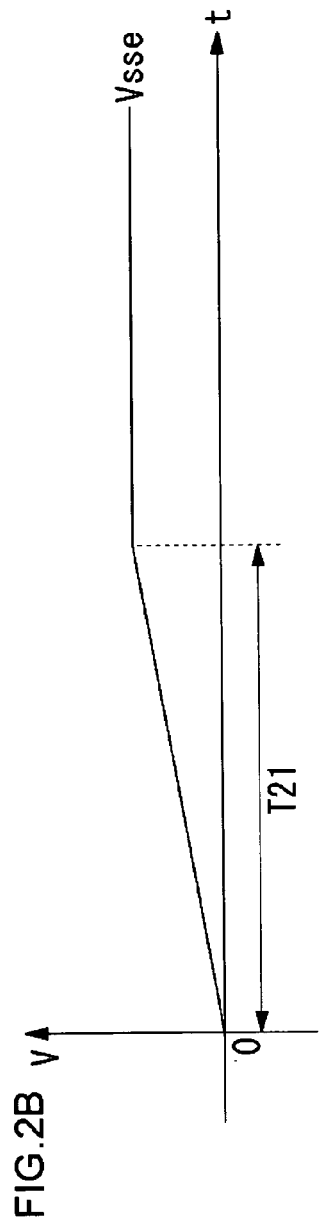
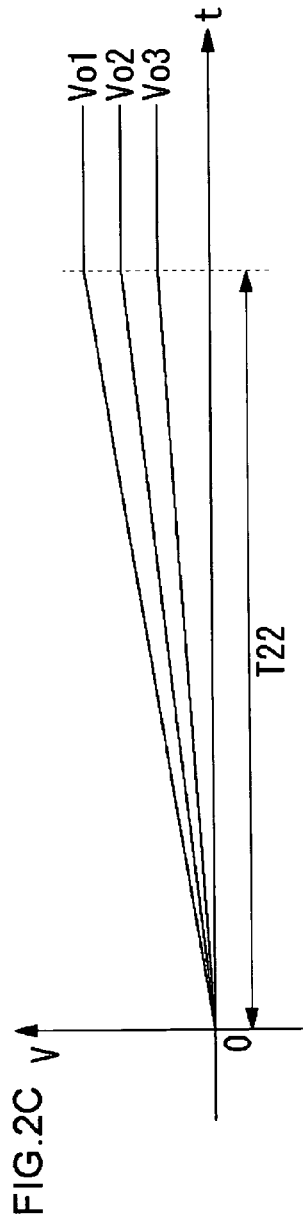

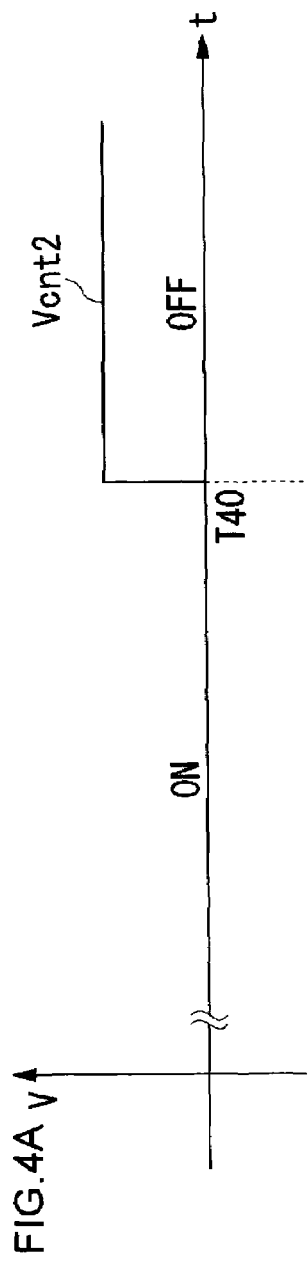
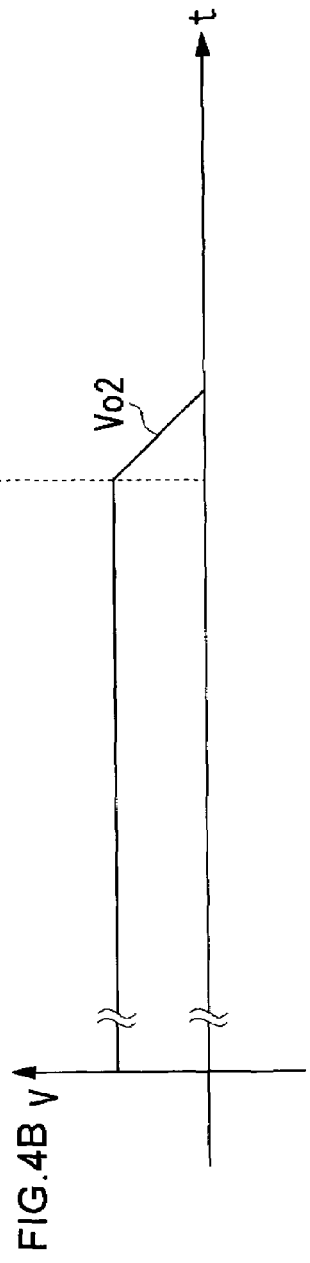
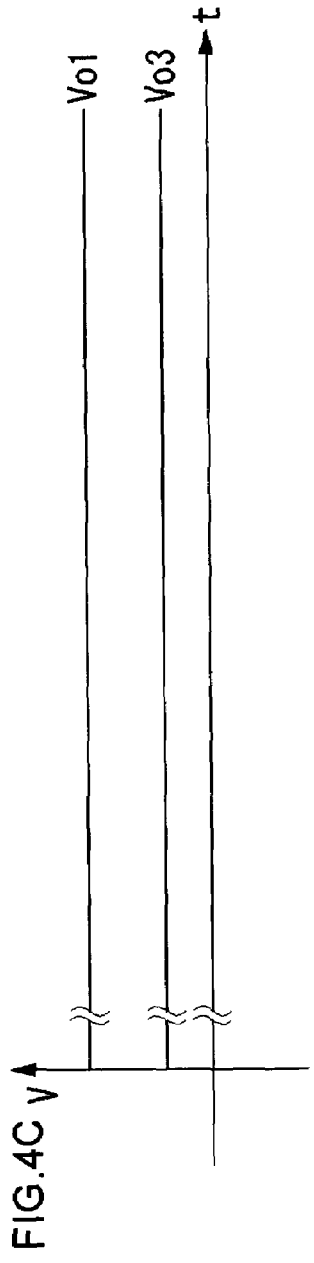
FIG.4A
FIG.4B
FIG.4C

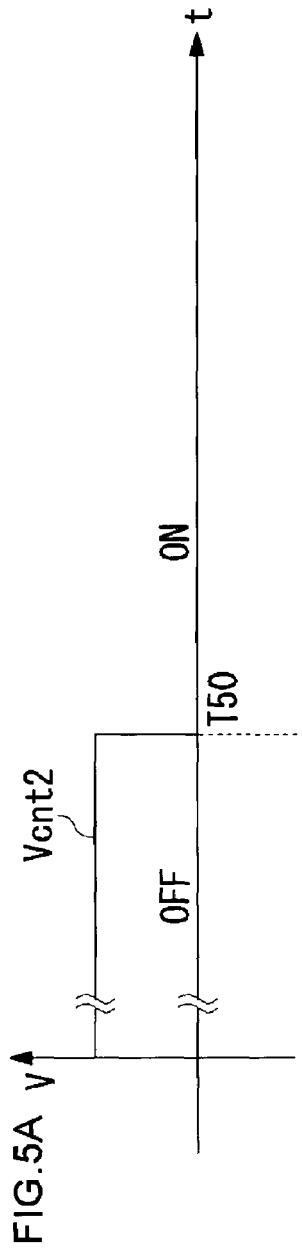
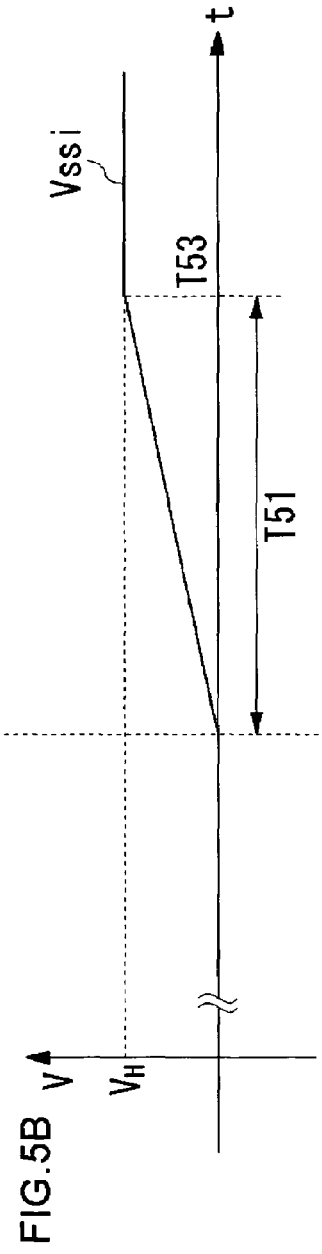
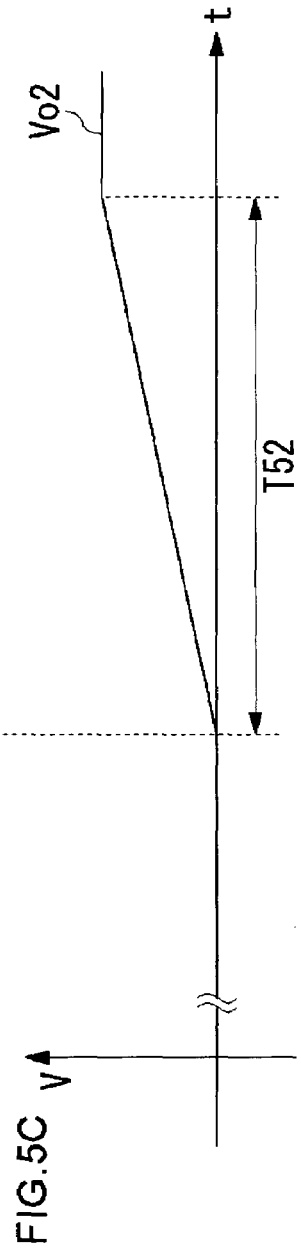

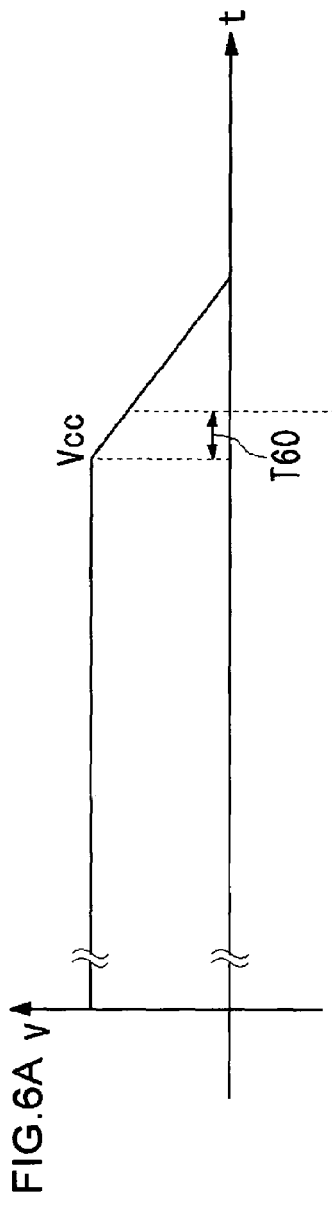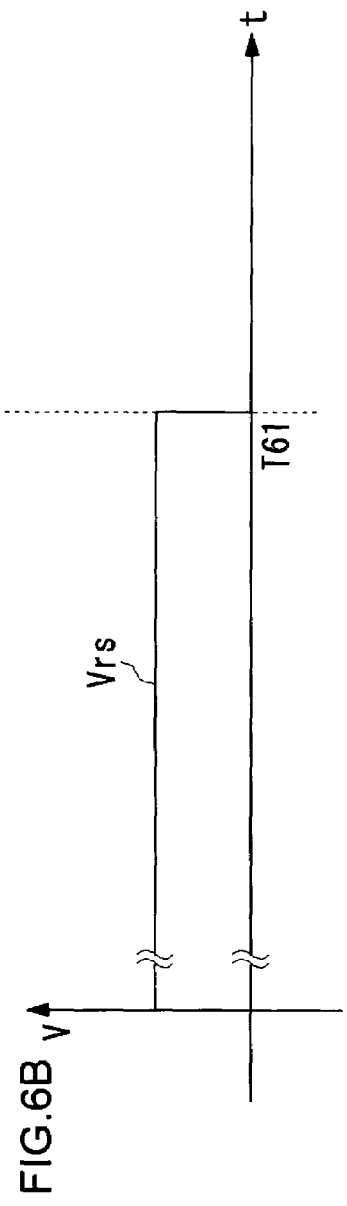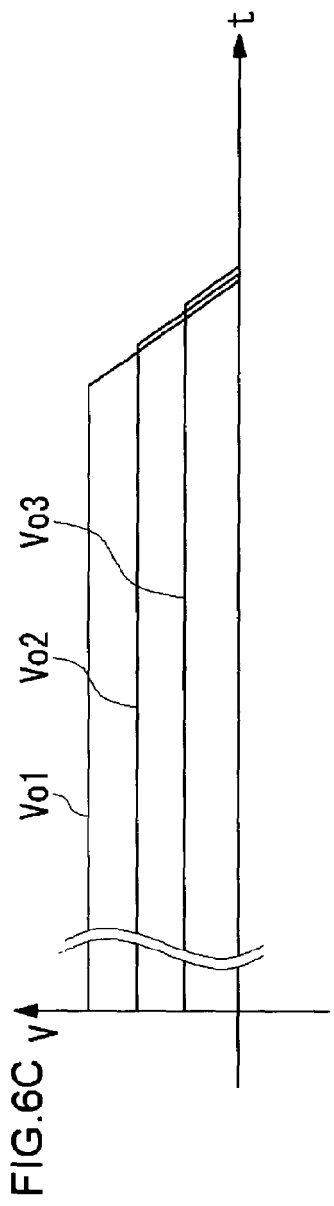

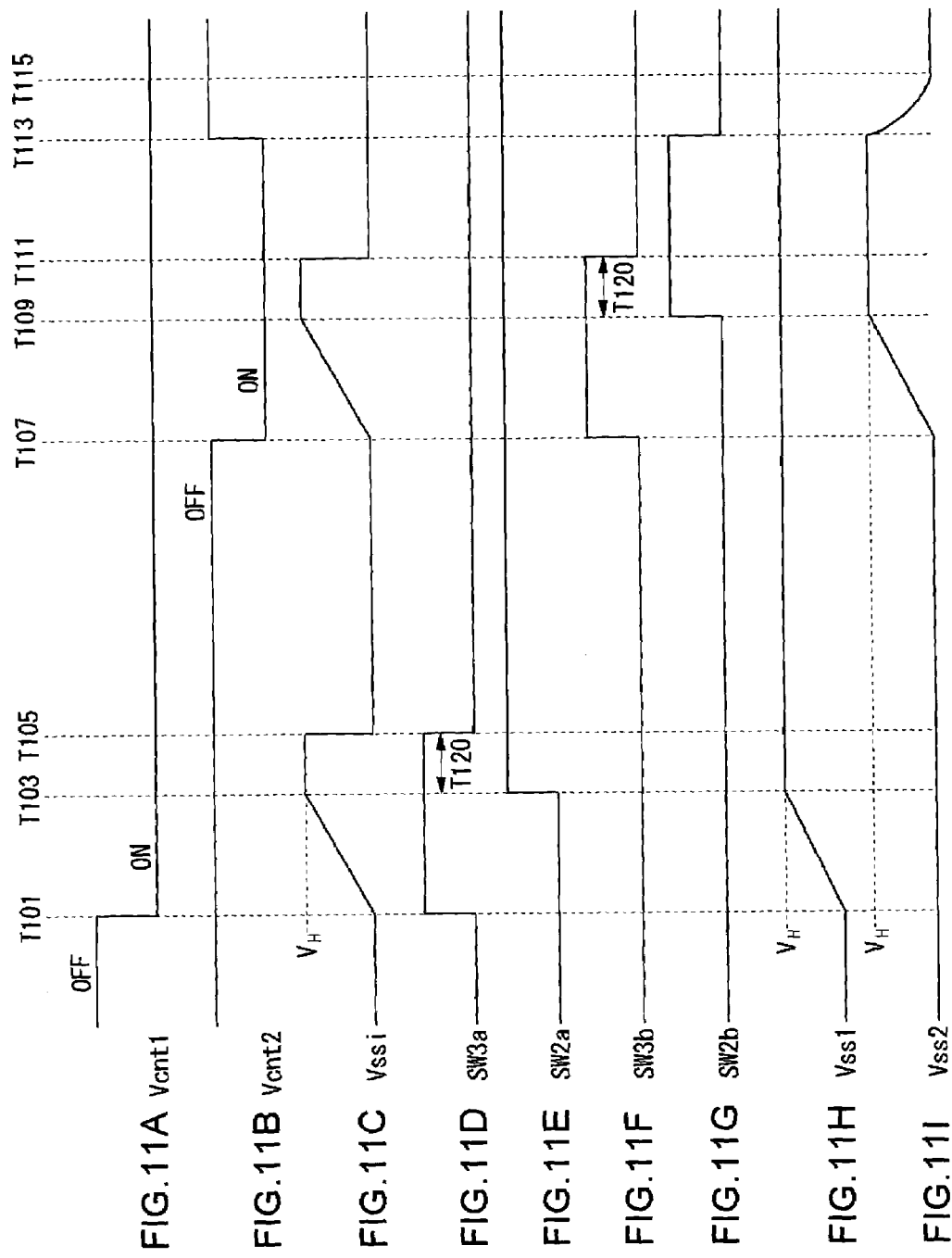

RELATED ART

POWER SUPPLY APPARATUS WITH SOFT START CONTROL

CROSS-REFERENCE TO RELATED APPLICATION

The present application is a continuation of PCT/JP2004/017414, filed on Nov. 24, 2004, the entire contents of which are incorporated herein by reference, and which claims the benefit of the date of the earlier filed Japanese Patent Applications No. JP2003-424455 filed on Dec. 22, 2003 and No. JP2004-326320 filed on Nov. 10, 2004.

BACKGROUND OF THE INVENTION

1. Field of the Invention

The present invention relates to a power supply apparatus such as a switching regulator and, more particularly, to a soft start technology associated with the apparatus.

2. Description of the Related Art

FIG. 12 is a block diagram of a power supply apparatus according to the related art. As illustrated, the power supply apparatus is usually provided with soft start circuits 101a-101c for the purpose of preventing destruction of switching transistors due to a rush current occurring at start-up and preventing overshoot in the waveform of an output voltage as it rises.

The soft start circuits 101a-101c are configured to gradually increase (soft start) an output voltage by increasing a conduction period (on duty) of the switching transistors over a predetermined period of time since start-up. For example, on-duty of the switching transistors is controlled so that the output voltage is increased in accordance with the waveform of the charged voltage of capacitors 104a-104c of a time-constant circuit.

However, when a plurality of loads (117a-117c) requiring different supply voltages (Vo1-Vo3) are provided in a single apparatus, there may arise a need to provide a plurality of power supply circuits 105a-105c in the apparatus.

In this case, the power supply apparatus is often subject to on and off control by a host 111 after a sufficient period of time has elapsed since power from a power supply voltage Vcc indicated in the drawing is turned on (hereinafter, referred to as power-on), for the purpose of power saving. Accordingly, such a multi-channel power supply apparatus needs the soft start circuits 101a-101c and the external capacitors 104a-104c for respective channels, thwarting efforts reduce the number of components.

"Example of applied circuits" section in non-patent document 1 describes "capacitors SS1, SS2, SS3" which correspond to the external capacitors described above.

[Non-Patent Document]

Manual of "HDD system power supply BD9786KN", January 2003, Rohm Corporation

SUMMARY OF THE INVENTION

The present invention has been made in view of the aforementioned problems and relates to a power supply apparatus capable of subjecting each of a plurality of supply voltages to soft start, while preventing the number of components from being increased.

An embodiment of the present invention provides a power supply apparatus. The power supply apparatus comprises: a plurality of power supply circuits which supply voltages to respective loads; a common soft start circuit which is operated when the plurality of voltages output from the plurality of power supply circuits are caused to make a transition simultaneously; an individual soft start circuit including a first terminal for outputting a predetermined fixed voltage and a second terminal outputting a voltage that varies with time, the individual soft start circuit being operated when any of the plurality of supply voltages output from the plurality of power supply circuits is caused to make a transition individually; a common soft start switch provided for each of the plurality of power supply circuits, the common soft start switch connecting the power supply circuit with the common soft start circuit; an individual soft start switch provided for each of the plurality of power supply circuits, the individual soft start switch connecting the power supply circuit with the first terminal or the second terminal of the individual soft start circuit. The plurality of power supply circuits subject the respective supply voltages to soft start control in accordance with the soft start voltage output from the common soft start circuit or the individual soft start circuit.

According to this embodiment, by allowing the two soft start circuits to be shared by the plurality of power supply circuits, the voltages from the circuits are concurrently subject to soft start control at, for example, power-on or power-off. In contrast, when any of the power supply circuits is singularly turned on or off, the individual soft start circuit is used. With this, the number of components is reduced as compared with a case where a soft start circuit is provided for each of the plurality of power supply circuits.

The plurality of power supply circuits may close the individual soft start switch in accordance with an externally supplied control signal and apply soft start control to the respective supply voltages in accordance with the soft start voltage output from the individual soft start circuit.

The plurality of power supply circuits may close the common soft start switch at power-on or power-off and apply soft start control to the respective supply voltages in accordance with the soft start voltage output from the common soft start circuit.

The common soft start circuit may comprise: a constant current source which charges a common soft start capacitor by supplying a constant current thereto; and a transistor which is provided parallel with the common soft start capacitor and discharges the common soft start capacitor in accordance with a timing signal input to the gate of the transistor.

The individual soft start circuit may comprises: a latch power supply which outputs a predetermined voltage; and a digital-to-analog conversion circuit which outputs a voltage of a ramp waveform in accordance with a digital signal input to a digital input terminal, the output voltage at its maximum level being equal to the predetermined voltage, wherein the predetermined voltage may be output from a first terminal and the voltage with a ramp waveform may be output from a second terminal.

The individual soft start circuit may comprise: a latch power supply which outputs a predetermined voltage; an individual soft start capacitor; a constant current source which charges the individual soft start capacitor by supplying a constant current thereto; and a transistor which is provided parallel with the individual soft start capacitor and discharges the individual soft start capacitor in accordance with a timing signal input to the gate of the transistor, wherein the predetermined voltage may be output from a first terminal and a voltage at a node between the individual soft start capacitor and the constant current source may be output from a second terminal.

The individual soft start circuit may comprise: a latch power supply which outputs a predetermined voltage; an individual soft start capacitor; a constant current source which charges the individual soft start capacitor by supplying a constant current thereto; and a transistor which is provided parallel with the individual soft start capacitor and discharges the individual soft start capacitor in accordance with a timing signal input to the gate of the transistor, wherein the predetermined voltage may be output from a first terminal and a voltage at a node between the individual soft start capacitor and the constant current source may be output from a second terminal.

The individual soft start circuit may comprise: a latch power supply which outputs a predetermined voltage; an individual soft start capacitor; a charge transistor provided between the individual soft start capacitor and the latch power supply; and a discharge transistor which is provided parallel with the individual soft start capacitor and discharges the individual soft start capacitor in accordance with a timing signal input to the gate of the discharge transistor, wherein the predetermined voltage may be output from a first terminal and a voltage at a node between the individual soft start capacitor and the discharge transistor may be output from a second terminal.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2A through 2C are time charts showing voltage variation at respective nodes.

FIGS. 4A through 4C are time charts showing a control signal from a host and voltage variation at respective nodes.

FIGS. 5A through 5C are time charts showing a control signal from a host and voltage variation at respective nodes.

FIGS. 6A through 6C are time charts showing voltage variation at respective nodes in the power supply apparatus of FIG. 1.

FIGS. 11A through 11I are time charts showing the waveforms of control signals and open and closed states of switches.

DETAILED DESCRIPTION OF THE INVENTION

Figure 1:
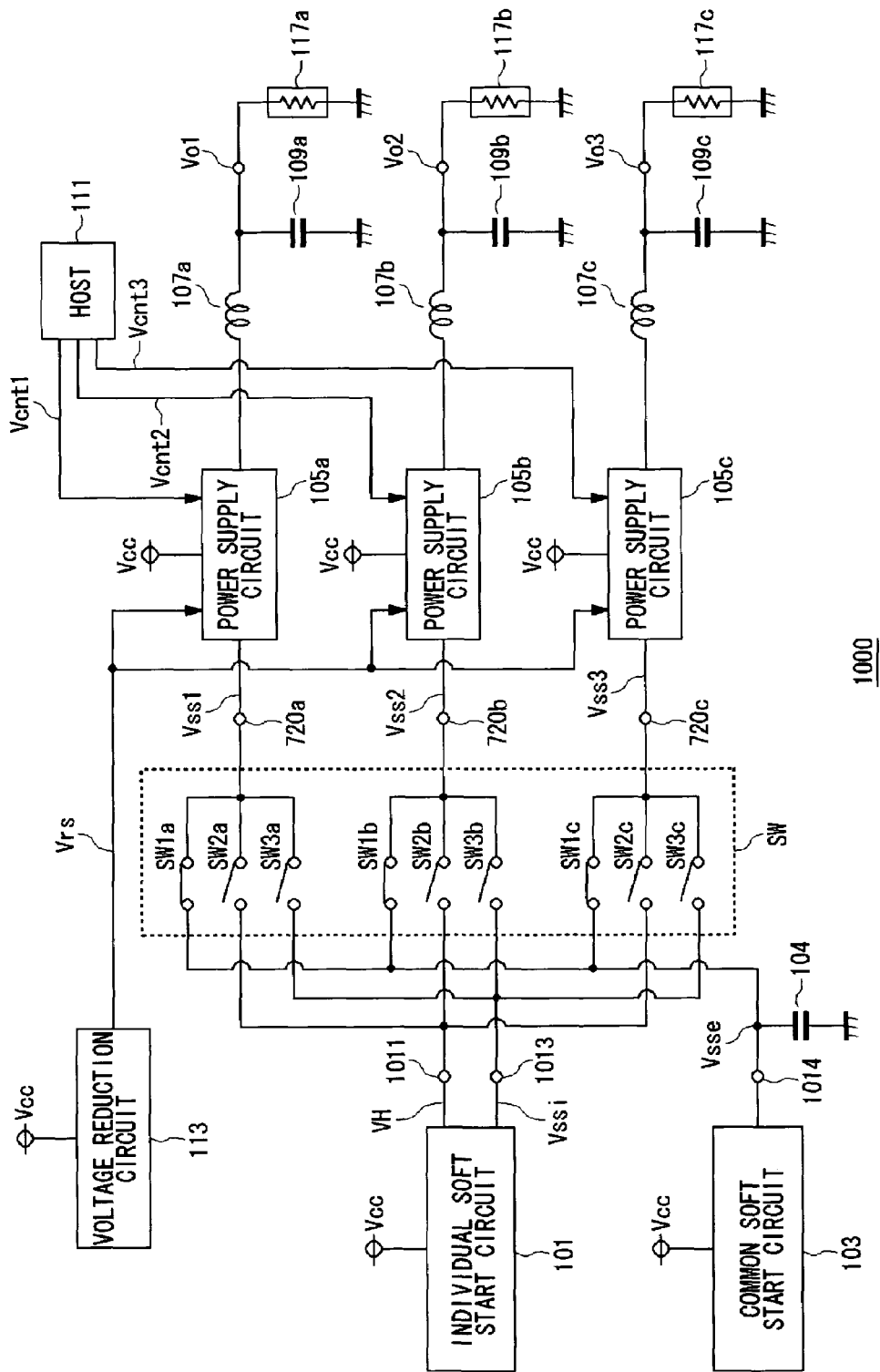
FIG. 1 is a block diagram of a power supply apparatus according to an embodiment of the present invention.
Figure 3:
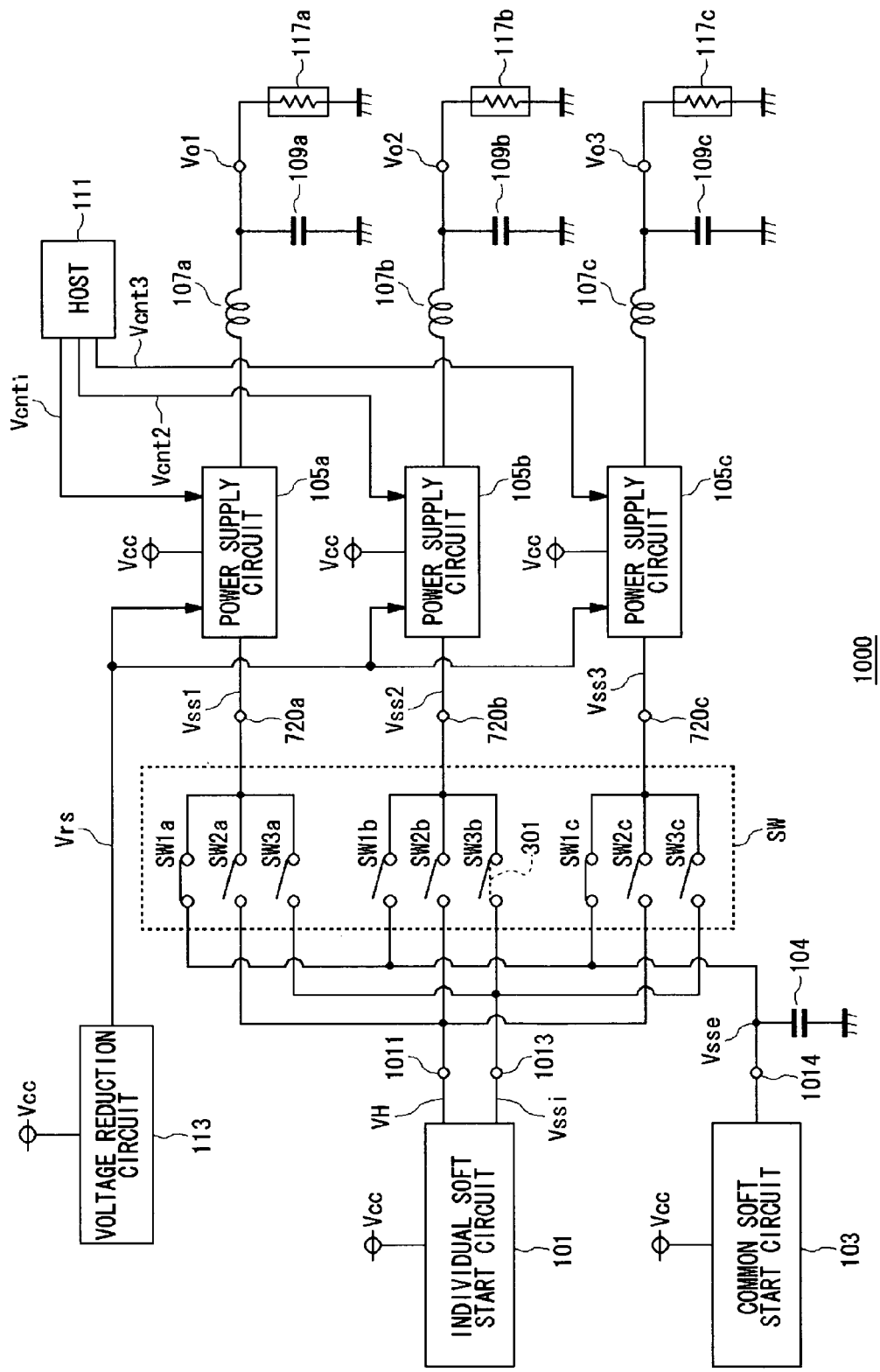
FIG. 3 is a block diagram of the power supply apparatus according to the embodiment of the present invention.
Figure 7:
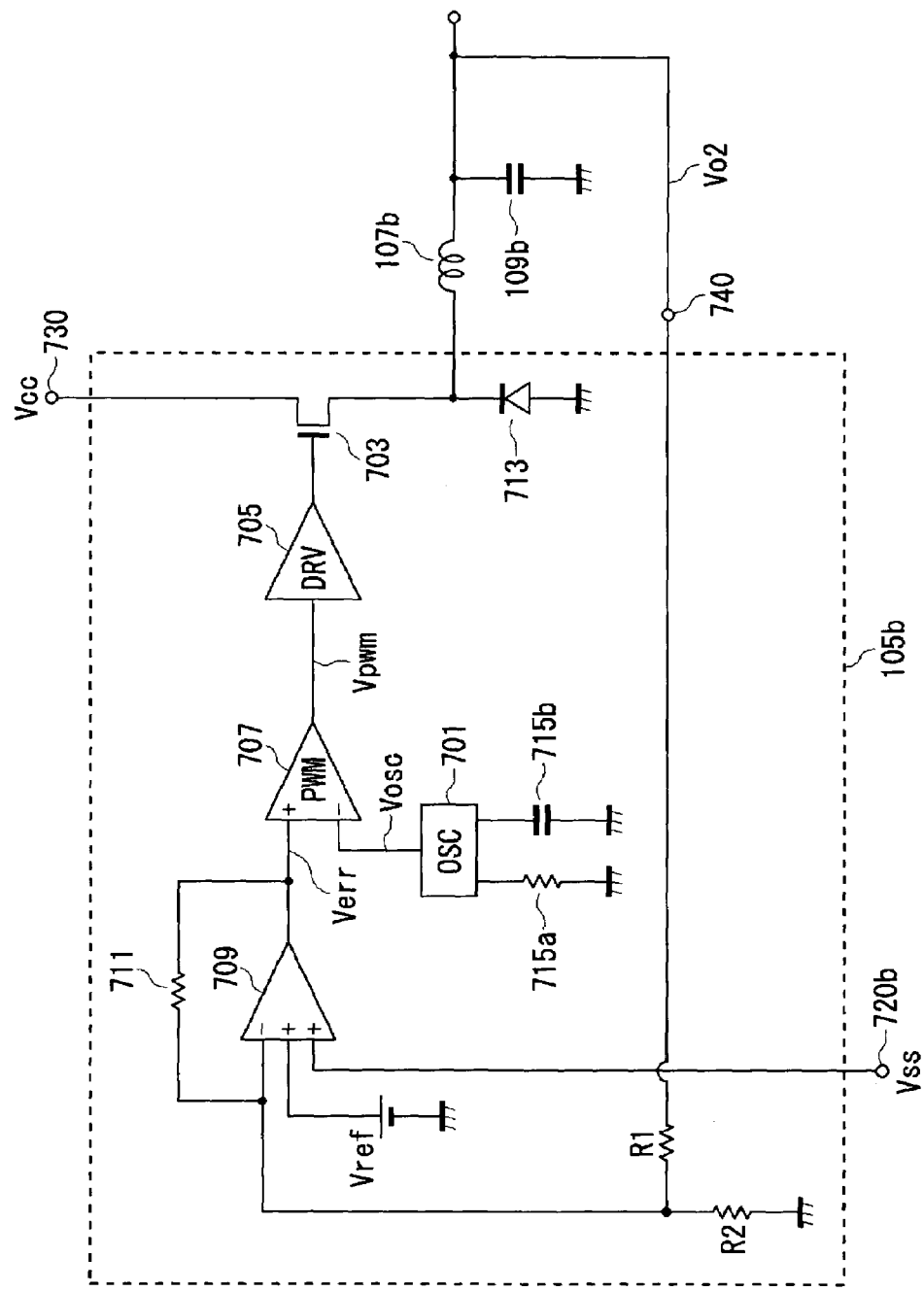
FIG. 7 is a circuit diagram of a power supply circuit according to the embodiment of the present invention.
Figure 8:
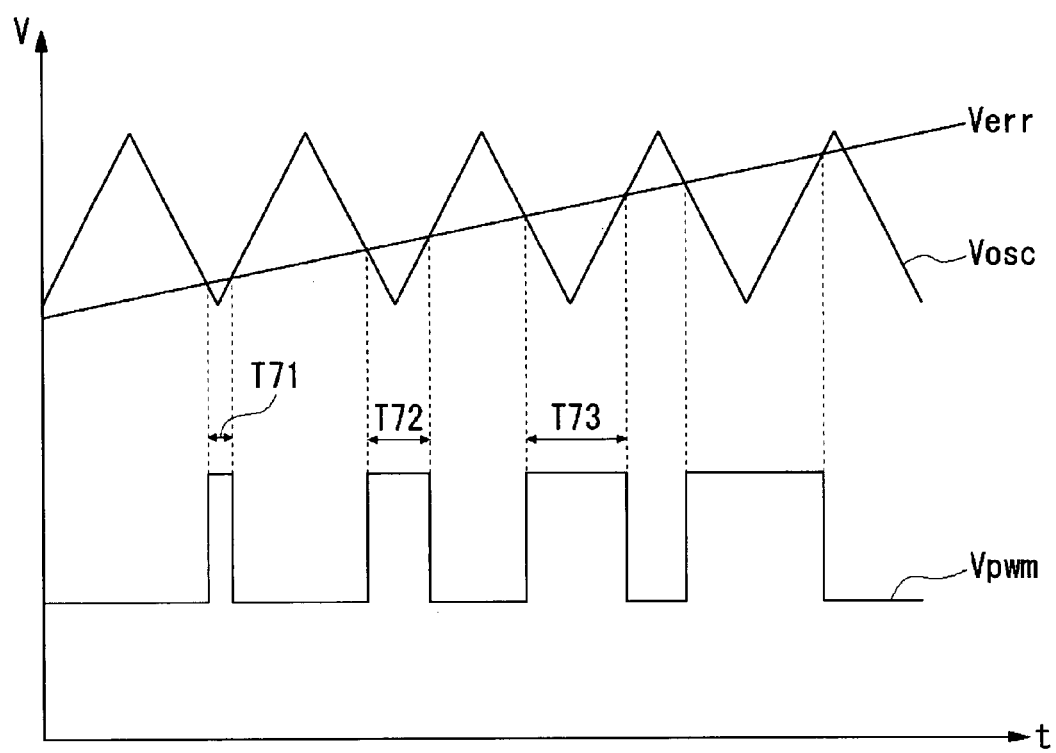
FIG. 8 illustrates time waveforms indicating the operation of the power supply circuit according to the embodiment of the present invention.
Figure 9:
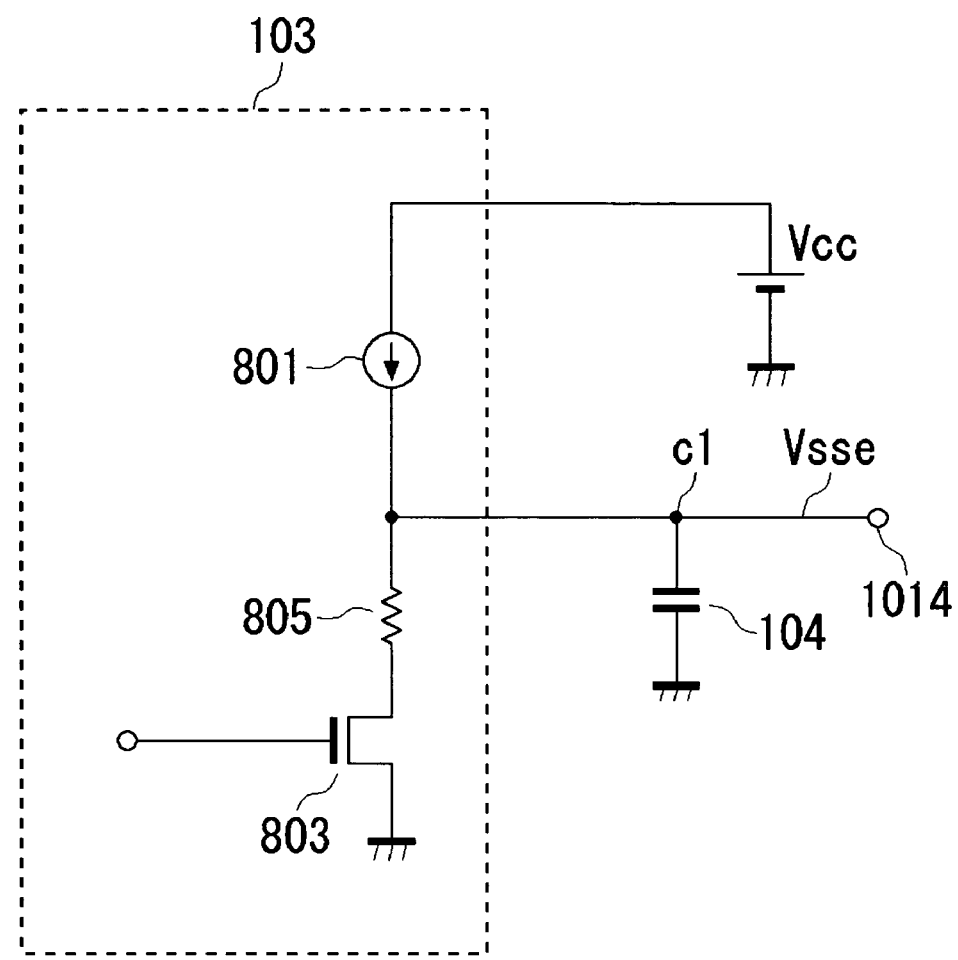
FIG. 9 is a circuit diagram of a common soft start circuit according to the embodiment of the present invention.

A detailed description of the embodiment of the present invention will be given by referring to the attached drawings. FIG. 1 and FIG. 3 are block diagrams of a power supply apparatus according to an embodiment of the present invention. FIGS. 2A through 2C are time charts indicating voltage variation at respective nodes at power-on. FIGS. 4A through 4C are time charts indicating voltage variation at respective nodes occurring when a power supply circuit 105b is turned off. FIGS. 5A through 5C are time charts indicating voltage variation at respective nodes occurring when the power supply circuit 105b in an off state shifts to an on state. FIGS. 6A through 6C are time charts showing voltage variation at respective nodes occurring at power-off. FIG. 7 is a circuit diagram of a power supply circuit according to the embodiment of the present invention. FIG. 8 illustrates time waveforms indicating the operation of the circuit. FIG. 9 illustrates an example of circuit structure of a common soft start circuit 103 and a common soft start capacitor 104 according to the embodiment of the present invention. FIGS. 10A through 10D are circuit diagrams of individual soft start circuits according to the embodiment of the present invention. FIGS. 11A through 11I are time charts indicating signal waveforms and voltage variation occurring in the power supply apparatus.

(1) Overall Structure of Power Supply Apparatus

Firstly, the overall structure of the power supply apparatus according to the embodiment will be described by referring to FIG. 1. FIG. 1 is a block diagram illustrating the structure of a power supply apparatus 1000 according to the embodiment of the present invention. The power supply apparatus 1000 is provided with three power supply circuits 105a-105c which output supply voltages Vo1-Vo3 to different loads 117a-117c, respectively.

Referring to FIG. 1, the power supply voltage for the apparatus as a whole is Vcc (V). When power derived from the power supply voltage Vcc is turned on, the supply voltages Vo1-Vo3 (V) are output to the loads 117a-117c, respectively.

The power supply apparatus 1000 includes a voltage reduction reset circuit 113, an individual soft start circuit 101, a common soft start circuit 103, a common soft start capacitor 104, power supply circuits 105a-105c, coils 107a-107c, smoothing capacitors 109a-109c and switches SW.

The power supply circuit 105a is connected to the load 117a via the coil 107a. Similarly, the power supply circuit 105b and the power supply circuit 105c are connected to the load 117b and the load 117c, respectively, via the coil 107b and the coil 107c, respectively.

An end of the smoothing capacitor 109a for smoothing the voltage Vo1 supplied to the load 117a is connected to a node between the coil 107a and the load 117a. The other end of the smoothing capacitor 109a is grounded. Similarly, an end of the smoothing capacitor 109b for generating the voltage Vo2 supplied to the load 117b is connected to a node between the coil 107b and the load 117b. The other end of the smoothing capacitor 109b is grounded. Further, an end of the smoothing capacitor 109c for generating the voltage Vo3 supplied to the load 117c is connected to a node between the coil 107c and the load 117c. The other end of the smoothing capacitor 109c is grounded.

Each of the power supply circuits 105a-105c is connected to the individual soft start circuit 101 and the common soft start circuit 103.

The power supply circuit 105a is connected to switches SW1a-SW3a. By selectively closing the switches SW1a-SW3a, the power supply circuit 105a is connected to a first terminal 1011 of the individual soft start circuit 101, a second terminal 1013 of the individual soft start circuit 101 or an output terminal 1014 of the common soft start circuit 103.

The power supply circuit 105b is connected to switches SW1b, SW2b and SW3b. By selectively closing the switches SW1b, SW2b and SW3b, the power supply circuit 105b is connected to the first terminal 1011 of the individual soft start circuit 101, the second terminal 1013 of the individual soft start circuit 101 or the output terminal 1014 of the common soft start circuit 103.

The power supply circuit 105c is connected to switches SW1c-SW3c. By selectively closing the switches SW1c-SW3c, the power supply circuit 105c is connected to the first terminal 1011 of the individual soft start circuit 10, the second terminal 1013 of the individual soft start circuit 101 or the output terminal 1014 of the common soft start circuit 103.

The soft start voltage from one of the three systems is switchably input to each of the power supply circuits 105a-105c. Details will be described later. The switches SW1a-SW1c are common soft start switches for connecting the power supply circuits 105a-105c to the common soft start circuit 103.

The switches SW3a-SW3c are individual soft start switches that are closed when the individual soft start circuit 101 is started so as to connect the power supply circuits 105a-105c to the second terminal 1013 of the individual soft start circuit 101.

The switches SW2a-SW2c are connected to the first terminal 1011 of the individual soft start circuit 101 and are individual soft start switches for fixing the soft start voltage when it has risen.

Hereinafter, these switches SW1a-SW1c, SW2a-SW2c and SW3a-SW3c will be referred to as switches SW where distinction thereof is not essential.

The common soft start capacitor 104 is a time-constant circuit used in performing common soft start described later.

The voltage reduction reset circuit 113 is a circuit for transmitting a reset signal Vrs to the power supply circuits 105a-105c. The reset signal Vrs is switched to a high level or a low level. The high level of the reset signal corresponds to a steady state and the low level corresponds to a reset state.

The host 111 transmits control signals Vcnt1-Vcnt3 described later to the power supply circuits 105a-105c so as to control the power supply circuits 105a-105c and exchanges control signals and information signals with various apparatuses (not shown). Referring to the figure, the control signals Vcnt1-Vcnt3 transmitted from the host 111 to the power supply circuits 105a-105c are illustrated using a single signal line. Actually, a plurality of controls signals are transmitted.

The specific circuit structure of the individual soft start circuit 101 and the common soft start circuit 103 will be described later (FIG. 9 and FIGS. 10A-10D).

(2) Description of the Power Supply Apparatus

A description will be given, with reference to FIGS. 1 through 6C, of the operating procedure followed in the power supply apparatus according to the embodiment between power-on and power-off.

(2-1) At Power-on

A description will be given, with reference to FIG. 1 and FIG. 2, of the procedure followed at power-on. At power-on, common soft start is performed by the common soft start circuit 103 and the common soft start capacitor 104 for the entire channels.

The host 111 controls on and off of the switches SW at power-on.

The switches SW1a-SW1c are closed as illustrated in FIG. 1 and the other switches are open so as to connect soft start terminals 720a-720c of the power supply circuits 105a-105c to the common soft start circuit 103 and the common soft start capacitor 104. At power-on, the power supply circuits 105a-105c are soft started by the common soft start circuit 103 and the common soft start capacitor 104.

FIGS. 2A through 2C are time charts showing voltage variation at respective nodes occurring at power-on. FIG. 2A illustrates the variation of the power supply voltage Vcc. FIG. 2B illustrates the variation of a common soft start voltage Vsse of the common soft start circuit 103. FIG. 2C illustrates the variation of the voltages Vo1-Vo3 supplied to the loads 117a-117c. In FIGS. 2A-3C, the vertical axis represents a voltage (V) and the horizontal axis represents time t (msec). At power-on, t=0.

Referring to FIG. 2A, the rise time of the power supply voltage Vcc is T20 (msec). An overshoot is caused without the soft start circuit. Referring to FIG. 2B, the rise time of the common soft start voltage Vsse of the common soft start capacitor 104 is T21 (msec).

FIG. 2C illustrates the variation of the voltages Vo1-Vo3 (V) supplied to the loads 117a-117c when soft start is performed by using the common soft start circuit 103 and the common soft start capacitor 104. As illustrated in FIG. 2C, the rise time of the supply voltages (Vo1-Vo3) is T22 (msec).

Thus, at power-on, the switches SW1a, SW1b and SW1c are closed so that the power supply circuits 105a-105c are gradually started by the common soft start voltage Vsse output from the common soft start circuit 103.

(2-2) When Off Signal is Transmitted (Host 111->Power Supply Circuit 105b)

In the power supply apparatus 1000 according to the embodiment, power saving is achieved by turning the plurality of power supply circuits 105a-105c on and off individually in accordance with the operating condition of the loads 117a-117c. For this purpose, the host 111 transmits the control signals Vcnt1-Vcnt3 for individually controlling the on and off state of the power supply circuits 105a-105c. In this embodiment, the high level of the control signals Vcnt1-Vcnt3 corresponds to an on state and the low level corresponds to an off state.

A description will be given, by referring to FIG. 3 and FIGS. 4A-4C, of the operating procedure for turning off the power supply circuit 105b when the supply of the voltage Vo2 to the load 117b is no longer necessary.

FIG. 3 is a block diagram illustrating the structure of the power supply apparatus 1000 according to the embodiment of the present invention. After common soft start is completed, the reset signal Vrs output from the voltage reduction reset circuit 113 is at a high level. When the control signal Vcnt2 transmitted from the host 111 designates a shift of the power supply circuit 105b to an off state while the reset signal Vrs remains at a high level, the switches SW1b-SW3b connected to the soft start terminal 720b of the power supply circuit 105b are all opened.

FIGS. 4A through 4C are time charts indicating voltage variation at respective nodes occurring when the power supply circuit 105b is turned off. FIG. 4A illustrates the variation of the control signal Vcnt2 transmitted from the host 111 to the power supply circuit 105b (the high level corresponds to an off state and the low level corresponds to an on state). FIG. 4B illustrates the variation of the voltage supplied to the load 117b. FIG. 4C illustrates the variation of the voltages supplied to the load 117a and the load 117c. In FIGS. 4A-4C, the vertical axis represents a voltage (V) and the horizontal axis represents time t (msec).

Referring to FIG. 4A, the host control signal Vcnt2 transmitted from the host 111 to the power supply circuit 105b is switched from a low level to a high level at time T40, designating a shift to an off state.

The power supply circuit 105b receiving the instruction to shift to an off state from the host 111 suspends its voltage step-down operation. As a result, the voltage Vo2 supplied to the load 117b is dropped starting at time T40. Voltage supply to the load 117b is eventually suspended. FIG. 4C illustrates the (constant) voltages Vo1 and Vol3 supplied to the load 117a and the load 11c, respectively.

(2-3) Restart of Power Supply Apparatus (Host 111->Power Supply Circuit 105b)

As described, in the power supply apparatus 1000 according to the embodiment of the present invention, the operation of the plurality of power supply circuits 105a-105c is individually turned on or off in accordance with the operating conditions of the loads 117a-117c. Accordingly, in order to restart the power supply circuit 105 after turning it off, the control signal Vcnt transmitted from the host 111 to the power supply circuit 105 is switched to a low level.

A description will now be given, by referring to FIG. 3 and FIGS. 5A-5C, of the operating procedure followed when the host 111 directs the power supply circuit 105b in an off state to shift to an on state. In this case, the power supply circuit 105b is soft started using the individual soft start circuit 101.

The power supply circuit 105b directed by the host 111 to shift to an on state closes only the switch SW3b (indicated by a broken line 301 in FIG. 3) and maintains the switches SW1b and the switch SW2b open. With this, the power supply circuit 105b connects its soft start terminal 720b to the individual soft start circuit 101 via the second terminal 1013. Accordingly, the power supply circuit 105b is soft started at restart by a soft start voltage Vssi output from the individual soft start circuit 101.

FIGS. 5A through 5C are time charts indicating voltage variation at respective nodes when the power supply circuit 105b in an off state shifts to an on state. FIG. 5A illustrates voltage variation of the control signal Vcnt2 transmitted from the host 111 to the power supply circuit 105b (the high level corresponds to off and the low level corresponds to on). FIG. 5B illustrates the variation of the individual soft start voltage Vssi output from the individual soft start circuit 101. FIG. 5C illustrates the variation of the voltage Vo2 supplied to the load 117b. In FIGS. 5A-5C, the vertical axis represents a voltage (V) and the horizontal axis represents time t (msec).

As illustrated in FIG. 5A, the control signal Vcnt2 transmitted from the host 111 to the power supply circuit 105b shifts from a high level to a low level at time T50, designating a shift to an on state. As a result, as illustrated in FIG. 5B, the individual soft start voltage Vssi output from the second terminal 1013 of the individual soft start circuit 101 rises to a maximum voltage VH in a period T51 (msec).

FIG. 5C illustrates the variation of the voltage Vo2(V) supplied to the load 117b occurring when soft start is performed using the individual soft start circuit 101. As illustrated, the rise time of the supply voltage (Vo2) is T52 (msec).

The power supply circuit 105b opens the switch SW3b and closes the switch SW2b in a period after time T53, when the individual soft start voltage Vssi output from the second terminal 1013 of the individual soft start circuit 101 fully rises. Details will be described later. As a result, the soft start terminal 720b of the power supply circuit 105b is connected to the first terminal 1011 of the individual soft start circuit 101. The soft start terminal 720b is fixed at the maximum voltage VH output from the first terminal 1011 of the individual soft start circuit 101.

(2-4) When Power is Turned Off

A description will now be given of the operating procedure followed at power-off, when power derived from the power supply voltage Vcc, an input voltage to the power supply circuit 105b, is turned off.

When power-off is designated, the reset signal Vrs output from the voltage reduction reset circuit 113 to the power supply circuits 105a-105c is brought to a low level. When the reset signal Vrs goes low, the power supply circuits 105a-105c switch their destination of connection from the individual soft start circuit 101 to the common soft start circuit 103 and the common soft start capacitor 104.

As illustrated in FIG. 1, the power supply circuits 105a-105c close the switches SW1a-SW1c, respectively, and open the switches SW2a, SW3a, SW2b, SW3b, SW2c and SW3c so as to connect the soft start terminals 720a-720c of the power supply circuits 105a-105c to the common soft start circuit 103 and the common soft start capacitor 104.

FIGS. 6A through 6C are time charts showing voltage variation at respective nodes occurring at power-off.

FIG. 6A illustrates the variation of the power supply voltage Vcc. FIG. 6B illustrates voltage variation of the reset signal Vrs (the high level corresponds to a steady state and the low level corresponds to a reset state). FIG. 6C illustrates the variation of the voltage supplied to the loads 117a-117c. In FIGS. 6A-6C, the vertical axis represents a voltage (V) and the horizontal axis represents time t (msec).

Referring to FIGS. 6A and 6B, the power supply voltage Vcc starts to drop at time T60. After time T60 elapses, the reset signal Vrs transmitted from the voltage reduction reset circuit 113 to the power supply circuits 105a-105c is brought to a low level. When the reset signal Vrs goes low, designating a shift to a reset state, the voltages Vo1-Vo3 supplied to the loads 117a-117c drop as illustrated in FIG. 6C.

(3) Circuit Structure of Power Supply Circuit

FIG. 7 illustrates an example of circuit structure of the power supply circuit 105 according to the embodiment of the present invention. The following description concerns the structure of the power supply circuit 105b. The description applies similarly to the power supply circuit 105a and the power supply circuit 105c. FIG. 7 also illustrates the coil 107b and the smoothing capacitor 109b connected to the power supply circuit 105b.

The power supply circuit 105b includes an error amplifier 709, an oscillator 701, a driver 705, a switching transistor 703, a diode 713, a PWM comparator 707, resistors R1 and R2, and a feedback resistor 711.

The soft start terminal 720b is a terminal for connection with the switches SW1b-SW3b. The soft start voltage Vss output from the individual soft start circuit 101 or the common soft start circuit 103 is input to the terminal. The power supply voltage Vcc is applied to the input voltage terminal 730. The voltage Vo2 supplied to the load is fed back to a feedback terminal 740.

The switching transistor 703, the diode 713 and the externally coupled coil 107 and the smoothing capacitor 109b constitute a switching regulator of a step-down type. The switching regulator steps down the power supply voltage Vcc input to the input voltage terminal 730 to a target value determined by a reference voltage Vref and outputs the stepped-down voltage.

The power supply voltage Vcc, an input voltage, is input to an end of the switching transistor 703. The other end of the switching transistor 703 is connected to the rectifying diode 713. The voltage at a node between the switching transistor 703 and the diode 713 is output as the supply voltage Vo2 via the coil 107b.

A pulse-width modulated switching signal output from the driver 705 is input to the gate of the switching transistor 703. The switching transistor 703 is subject to on and off control in accordance with the duty ratio of the switching signal. The coil 107b is supplied with a current alternately via the switching transistor 703 and the diode 713, in accordance with the on and off of the switching transistor 703. As a result, energy conversion is performed by the coil 107b and the smoothing capacitor 109b so that the power supply voltage Vcc is stepped down. The coil 107b and the smoothing capacitor 109b constitute a filter and the supply voltage Vo2 is output as a smoothed dc voltage.

The supply voltage Vo2 is divided by the resistors R1 and R2 before being fed to the error amplifier 709. The error amplifier 709 amplifies a voltage error of the supply voltage Vo2 divided by the resistors R1 and R2 with respect to the soft start voltage Vss applied to the soft start terminal 720 and a voltage error of the supply voltage Vo2 divided by the resistors with respect to the reference voltage Vref. The error amplifier 709 outputs the error voltage Verr to the PWM comparator 707. The feedback resistor 711 is connected to the error amplifier 709.

The oscillator 701 outputs a triangular wave at a predetermined frequency that defines a switching period. The resistor 715a and the capacitor 715b are provided to adjust the oscillating frequency of the oscillator 701.

The PWM comparator 707 compares the error voltage Verr output from the error amplifier 709 with the oscillating voltage Vosc output from the oscillator 701. If Verr>Vosc, the PWM comparator 707 generates a high-level pulse-width modulated PWM signal Vpwm. If Verr<Vosc, a low-level PWM signal Vpwm is output.

The driver 705 controls the gate voltage of the switching transistor 703 in accordance with the PWM signal Vpwm generated by the PWM comparator 707 so as to turn on or off the switching transistor 703.

The power supply circuit 105b according to the embodiment maintains the voltage Vo2 supplied to the load 117b according to the PWM scheme for controlling the on-time ratio (the ratio between the conduction time of the switching transistor 703 and the oscillation period of the oscillator 701) of the switching transistor 703 (a main switching element) by a gate drive pulse. The on-time ratio is determined by comparing the output voltage Vosc of the oscillator 701, which is a voltage input to the inverting input of the PWM comparator 707, with the error voltage Verr output from the error amplifier 709, which is a voltage input to the non-inverting input of the PWM comparator 707.

In this embodiment, the soft start function is achieved by gradually increasing the on-time ratio by progressively extending a duration in which the error voltage Verr is higher than the output voltage Vosc of the oscillator 701 (interval T71->interval T72->interval T73) as illustrated in FIG. 8.

Further, since the soft terminal 720 is connected to the switches SW1b, SW2b and SW3b according to this embodiment, one of "the common soft start circuit 103 and the common soft start capacitor 104" and "the individual soft start circuit 101" is connected to the non-inverting input of the error amplifier 709, by selectively closing the switches SW1b, SW2b and SW3b.

As mentioned earlier, according to the embodiment, "the common soft start circuit 103 and the common soft start capacitor 104" are connected to the non-inverting input of the error amplifier 709 at power-on. Therefore, the common soft start voltage Vsse is input to the non-inverting input as the soft start voltage Vss. The feedback voltage Verr of FIG. 8 is gradually increased with the common soft start Voltage Vsse.

Further, according to this embodiment, the individual soft start circuit 101 is connected to the non-inverting input of the error amplifier 709 when the power supply circuit 105b shifts from an off state to an on state. Accordingly, the individual soft start voltage Vssi output from the individual soft start circuit 101 is input to the non-inverting input of the error amplifier 709 as the soft start voltage Vss. The error voltage Verr of FIG. 8 is increased with the individual soft start voltage Vssi.

(4) Circuit Structure of Common Soft Start Circuit

FIG. 9 illustrates an example of circuit structure of the common soft start circuit 103 and the common soft start capacitor 104 according to the embodiment.

An end of the common soft start capacitor 104 is grounded. The other end thereof is connected to a node C1 between the common soft start circuit 103 and the switches SW1a, SW1b and SW1c. A constant current source 801 is for charging the common soft start capacitor 104. The constant current source 801 is connected to the power supply Vcc. A node between the constant current source 801 and an end of a resistor 805 is connected to the common soft start capacitor 104. The other end of the resistor 805 is connected to the drain of a transistor 803. The source of the transistor 803 is grounded. The gate of the transistor 803 is connected to an electronic control circuit (not shown) and receives an timing signal.

With this circuit structure, the transistor 803 is turned on or off in accordance with the timing signal input to the gate of the transistor 803. When the transistor 803 is turned on, the common soft start capacitor 104 is discharged so that the voltage at the output terminal 1014 drops to a level close to the ground potential.

When the transistor 803 is turned off, the potential at the output terminal 1014 is increased as a result of a charge Q being stored in the common soft start capacitor 104 at power-on by a constant current supplied from the constant current source 801. More specifically, the coefficient of electrostatic capacity of the common soft start capacitor 104 is determined such that $$\int idt = it = Q = C \times Vcc, \ t = C \times Vcc/i = 5\text{--}10 \text{ msec},$$

where the charge Q=C×Vcc (C denotes the coefficient of electrostatic capacity of the common soft start capacitor 104) and the current=i.

The resistor 805 of the common soft start circuit 103 illustrated in FIG. 9 is not essentially. While the transistor 803 is illustrated in FIG. 9 as a MOS transistor, a bipolar transistor may also be used.

(5) Circuit Structure of Individual Soft Start Circuit

FIGS. 10A-10D illustrate circuit structures of the individual soft start circuit 101 according to the embodiment. In any of the types of illustrated individual soft start circuit 101, there are provided a first terminal 1011 and a second terminal 1013. The individual soft start voltage Vssi that is gradually increased with time is output from the second terminal 1013. The maximum value VH of the individual soft start voltage Vssi is constantly output from the first terminal 1011.

Figure 10A:
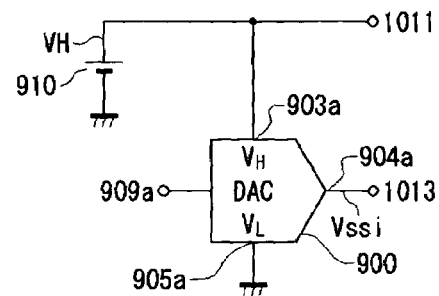
FIGS. 10A through 10D are circuit diagrams of individual soft start circuits according to the embodiment of the present invention.

(5-1) With Regard to Circuit Structure of FIG. 10A

A DAC circuit 900 is provided with a digital input terminal 909a, an analog output terminal 904a, a maximum voltage terminal 903a and a minimum voltage terminal 905a. The maximum voltage terminal 903a is connected to a latch power supply 910 so that the voltage VH is applied to the maximum voltage terminal 903a. The minimum voltage terminal 905a is grounded.

The digital input terminal 909a is connected to a timing generation circuit (not shown). The timing generation circuit is controlled by a control signal from the host 111. The first terminal 1011 outputs the maximum voltage VH output from the latch power supply 910.

In accordance with a control signal input to the digital input terminal 909a, the analog output terminal 904a outputs a voltage with a ramp waveform with a minimum voltage VL, which is applied to the minimum voltage terminal 905a, and a maximum voltage VH, which is applied to the maximum voltage terminal 903a.

The voltage output from the analog output terminal 904a is output from the second terminal 1013.

With this circuit structure, the potential at the second terminal 1013 is increased in accordance with an increase in digital code input to the digital input terminal 909a. When the potential reaches the maximum value (VH), the power supply circuits 105a-105c connect themselves with the latch power supply 910 by closing the switch SW2a (or SW2b, SW2c) and opening the switch SW3a (or SW3b, SW3c). With this, the soft start voltages Vss1-Vss3 input to the respective soft start terminals 720a-720c can be fixed.

Figure 10B:
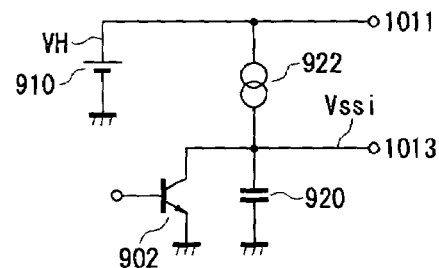

(5-2) With Regard to Circuit Structure of FIG. 10B

The first terminal 1011 outputs the voltage VH output from the latch power supply 910. An end of an individual soft start capacitor 920 is grounded and the other end thereof is connected to a constant current source 922. The voltage at a node between the capacitor 920 and the source 922 is output from the second terminal 1013. The constant current source 922 charges the individual soft start capacitor 920. A node between the constant current source 922 and the individual soft start capacitor 920 is connected to the collector of a transistor 902. The emitter of the transistor 902 is grounded. The base of the transistor 902 is connected to a timing generation circuit (not shown). The timing generation circuit is driven by a control signal from the host 111.

With this circuit, when the control signal Vcnt transmitted from the host 111 designates a shift to an on state, the transistor 902 is turned off, causing the individual soft start capacitor 920 to be charged by the constant current supplied from the constant current source 922. As a result, the potential at the second terminal 1013 is increased. When the potential reaches the maximum value VH, the power supply circuits 105a-105c connect themselves with the latch power supply 910 by closing the switch SW2a (or SW2b, SW2c) and opening the switch SW3a (or SW3b, SW3c) With this, the soft start voltages Vss1-Vss3 input to the respective soft start terminals 720a-720c can be fixed.

Figure 10C:
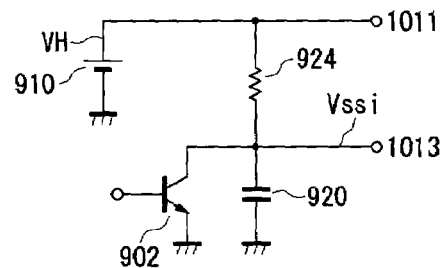

(5-3) With Regard to Circuit Structure of FIG. 10C

The structure of the individual soft start circuit 101 of FIG. 10C is such that the constant current source 922 of FIG. 10B is replaced by a resistor 924. The first terminal 1011 outputs the voltage VH output from the latch power supply 910. A node between the resistor 924 and the latch power supply 910 is connected to the first terminal 1011. Anode between the resistor 924 and the individual soft start capacitor 920 is connected to the collector of the transistor 902. The emitter of the transistor 902 is grounded. The base of the transistor 902 is connected to a timing generation circuit (not shown). The timing generation circuit is driven by a control signal from the host 111.

With this circuit, when the control signal Vcnt transmitted from the host 111 designates a shift to an on state, the transistor 902 is turned off, causing the individual soft start capacitor 920 to be charged. As a result, the potential at the second terminal 1013 is increased in accordance with a time constant determined by the resistance of the resistor 924 and the capacitance of the individual soft start capacitor 920. When the potential reaches the maximum value VH, the power supply circuits 105a-105c connect themselves with the latch power supply 910 by closing the switch SW2a (or SW2b, SW2c) and opening the switch SW3a (or SW3b, SW3c). With this, the soft start voltages Vss1-Vss3 input to the respective soft start terminals 720a-720c can be fixed.

Figure 10D:
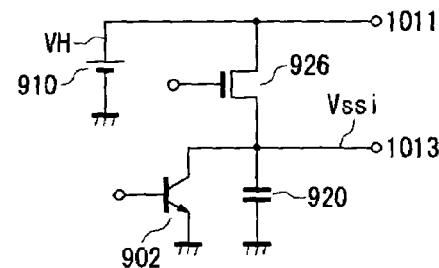
Figure 12:
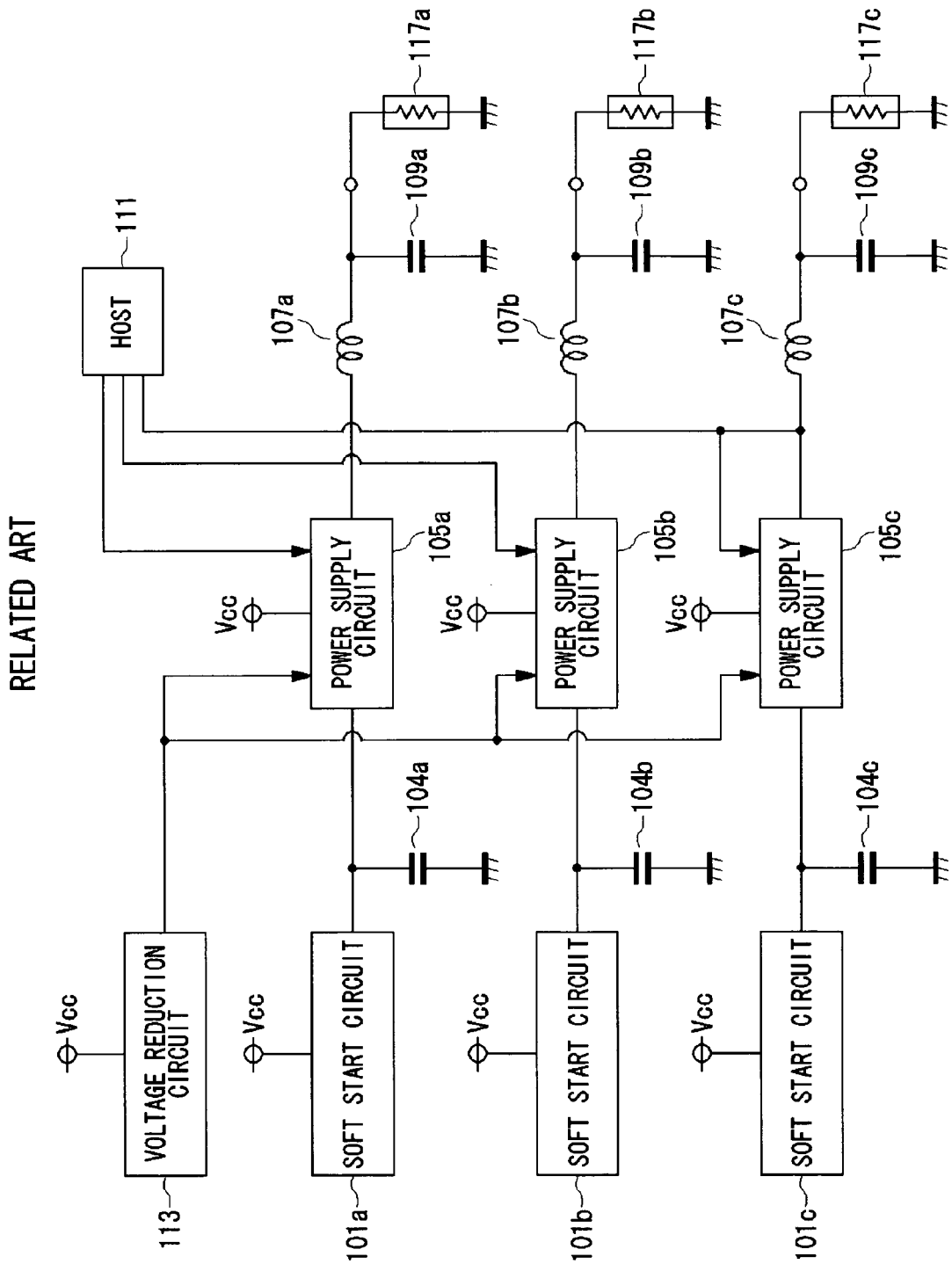
FIG. 12 is a block diagram of a power supply apparatus according to the related art.

(5-4) With Regard to Circuit Structure of FIG. 10D

The structure of the individual soft start circuit 101 of FIG. 10D is such that the constant current source 922 of FIG. 10B is replaced by a transistor 926. The first terminal 1011 outputs the voltage VH output from the latch power supply 910. An end of the individual soft start capacitor 920 is grounded and the other end thereof is connected to the second terminal 1013.

The gate of the transistor 926 is connected to a timing generation circuit (not shown). The timing generation circuit transmits a PWM signal in accordance with a control signal from the host 111 so as to change the conduction time of the transistor 926. As the conduction time varies, the transistor 926 functions as a variable resistor.

A node between the drain of the transistor 926 and the latch power supply 910 is connected to the first terminal 1011. A node between the source of the transistor 926 and the individual soft start terminal 920 is connected to the collector of the transistor 902 and the second terminal 1013. The emitter of the transistor 902 is grounded. The base of the transistor 902 is connected to a timing generation circuit (not shown). The timing generation circuit is driven by a control signal from the host 111.

With this circuit, when the control signal Vcnt transmitted from the host 111 designates a shift to an on state, the transistor 902 is turned off, causing the individual soft start capacitor 920 to be charged. As a result, the potential at the second terminal 1013 is increased. When the potential reaches the maximum value VH, the power supply circuits 105a-105c connect themselves with the latch power supply 910 by closing the switch SW2a (or SW2b, SW2c) and opening the switch SW3a (or SW3b, SW3c) With this, the soft start voltages Vss1-Vss3 input to the respective soft start terminals 720a-720c can be fixed. While the transistor 902 is illustrated in FIGS. 10A, 10B and 10C as a bipolar transistor, a MOS transistor may also be used.

(6) Signal Waveform and Voltage Variation when Host Transmits Control Signal

FIGS. 11A through 11I are time charts showing signal waveforms and voltage variation occurring when the control signal is transmitted from the host. The following description with reference to FIGS. 11A-11I relates to a case where the DAC circuit of FIG. 10A is used in the individual soft start circuit 101.

FIG. 11A shows a waveform of the control signal Vcnt1 supplied to the power supply circuit 105a. The high level corresponds to an off signal and the low level corresponds to an on signal.

FIG. 11B shows the waveform of the control signal Vcnt2 supplied to the power supply circuit 105b. The high level corresponds to an off signal and the low level corresponds to an on signal.

FIG. 11C shows the waveform of the output voltage from the DAC circuit 900, i.e., the individual soft start voltage Vssi output from the second terminal 1013 of the individual soft start circuit 101.

FIGS. 11D-11G show the waveforms indicating the open and closed conditions of the switch SW3a, the switch SW2a, the switch SW3b and the switch SW2b, respectively. The high level corresponds to a closed state and the low level corresponds to an open state.

FIG. 11H shows the waveform of the soft start voltage Vss1 input to the soft start terminal 720a of the power supply circuit 105a.

FIG. 11I shows the waveform of the soft start voltage Vss2 input to the soft start terminal 720b of the power supply circuit 105b.

(6-1) With Regard to Operation Between T101 and T103

The power supply circuit 105a, receiving the control signal Vcnt1 at a low level from the host 111, opens the switch SW1a and the switch SW2a and closes the switch SW3a so as to connect itself to the second terminal 1013 of the individual soft start circuit 101. Accordingly, the soft start voltage Vss1 input to the soft start terminal 720a of the power supply circuit 105a is increased (FIG. 11H) as the individual soft start voltage Vssi output from the DAC circuit 900 is increased (FIG. 11C).

(6-2) With Regard to Operation Between T103 and T105

The output voltage from the DAC circuit 900 (FIG. 11C) reaches the maximum value VH at time T103, triggering the power supply circuit 105a to close the switch SW2a. Thereafter, the switch SW2a and the switch SW3a are both closed until time T105. This is to prevent the voltage output from the individual soft start circuit 101 from becoming intermittent. In this state, the switch SW1a is open. In this period, the individual soft start circuit 101 and the power supply circuit 105a are connected to each other via the first terminal 1011 and the second terminal 1013. As illustrated in FIG. 11H, the soft start voltage Vss1 input to the soft start terminal 720a is maintained at the maximum value VH.

(6-3) With Regard to Operation Between T105 and T107

At time T105, i.e., when a predetermined period T120 elapses since time T103, the power supply circuit 105a opens the switch SW3a. Thereafter, only the switch SW2a is closed until the control signal Vcnt1 makes a transition from a low level to a high level. Accordingly, the individual soft start circuit 101 and the power supply circuit 105a are connected to each other via the first terminal 1011 after time T105 and until the control signal Vcnt1 makes a transition to a high level. As illustrated in FIG. 11H, the soft start voltage Vss1 input to the soft start terminal 720 is maintained at the maximum value VH.

(6-4) With Regard to Operation Between T107 and T109

When the control signal Vcnt2 transmitted from the host 111 is switched to a low level, the power supply circuit 105b opens the switch SW1b and the switch SW2b and closes the switch SW3b so as to connect itself to the second terminal 1013 of the individual soft start circuit 101. Accordingly, as the individual soft start voltage Vssi output from the DAC circuit 900 is increased (FIG. 1C), the soft start voltage Vss2 input to the soft start terminal 720b of the power supply circuit 105b is increased (FIG. 11I).

(6-5) With Regard to Operation Between T109 and T111

The soft start voltage Vssi reaches the maximum value VH at time T109, triggering the power supply circuit 105b to close the switch SW2b. Thereafter, the switch SW2b and the switch SW3b are both closed until time T111. This is to prevent the voltage output from the individual soft start circuit 101 from becoming intermittent. In this state, the switch SW1b is open. In this period, the individual soft start circuit 101 and the power supply circuit 105a are connected to each other via the first terminal 1011 and the second terminal 1013. As illustrated in FIG. 11H, the soft start voltage Vss2 input to the soft start terminal 720b is maintained at the maximum value VH.

(6-6) With Regard to Operation Between T111 and T113

At time T111, i.e., when a predetermined period T120 elapses since time T109, the power supply circuit 105b opens the switch SW3b. Thereafter, only the switch SW2b is closed until time T113. Accordingly, the individual soft start circuit 101 and the power supply circuit 105b are connected to each other via the first terminal 1011 in a period between T111 and T113. The soft start voltage Vss2 input to the soft start terminal 720b is maintained at the maximum value VH.

(6-7) With Regard to Operation after T113

The control signal Vcnt2 makes a transition to a high level at time T113, triggering the power supply circuit 105b to open the switch SW2b again. In this state, the switches SW1b-SW3b connected to the power supply circuit 105b are all opened so that the soft start voltage Vss2 input to the soft start terminal 720 converges to 0V.

Described above is an explanation based on the embodiment. Those skilled in the art will envision many other possible variations and improvements within the scope of the present invention.

For example, while the circuit illustrated in FIG. 7 is used as the power supply circuit and the circuit illustrated in FIG. 9 is used as the common soft start circuit, alternative circuit structures are possible.

The power supply circuit of the embodiment is described as being implemented by a switching regulator of a step-down type, a switching regulator of a step-up type may also be used.

The power supply apparatus according to the invention may be comprehended as follows.

The power supply apparatus comprises: a plurality of power supply circuits which supply voltages to respective loads; a common soft start switch connected to each of the plurality of power supply circuits; an individual soft start switch connected to each of the plurality of power supply circuits; a common soft start circuit commonly connected to the plurality of power supply circuits via the common soft start switch; and an individual soft start circuit commonly connected to the plurality of power supply circuits via the individual soft start switch.

The power supply circuit may connect itself to the individual soft start circuit in response to a control signal, by closing the individual soft start switch connected to the circuit.

The power supply circuit may connect itself to the common soft start circuit and the common soft start capacitor at power-off, by closing the common soft start switch connected to the circuit.

The common soft start circuit preferably comprises: a constant current source for charging the common soft start capacitor via a node connected to the common soft start capacitor; and a transistor for discharging the common soft start capacitor via the node in accordance with a timing signal input to the transistor gate.

The individual soft start circuit preferably comprises: first and second nodes connected to the individual soft start switch; a DAC circuit for outputting a voltage of a ramp waveform via the first node; and a latch power supply for outputting a predetermined voltage via the second node.

The individual soft start circuit in one variation preferably comprises: first and second nodes connected to the individual soft start switch; an individual soft start capacitor; a constant current source for charging the individual soft start capacitor; a second transistor for discharging the individual soft start capacitor via a node between the individual soft start capacitor and the constant current source and via the first node, in accordance with a timing signal input to the transistor gate; and a latch power supply for outputting a constant voltage via the second node.

The individual soft start circuit in another variation preferably comprises: first and second nodes connected to the individual soft start switch; an individual soft start capacitor; a resistor for charging the individual soft start capacitor; a second transistor for discharging the individual soft start capacitor via a node between the individual soft start capacitor and the resistor and via the first node, in accordance with a timing signal input to the transistor gate; and a latch power supply for outputting a constant voltage via the second node.

The individual soft start circuit in another variation preferably comprises: first and second nodes connected to the individual soft start switch; an individual soft start capacitor; a first transistor for charging the individual soft start capacitor; a second transistor for discharging the individual soft start capacitor via a node between the individual soft start capacitor and the first transistor and via the first node, in accordance with a timing signal input to the transistor gate; and a latch power supply for outputting a constant voltage via the second node.

The apparatus according to the present invention can be used to, drive a variety of loads.

While the preferred embodiments of the present invention have been described using specific terms, such description is for illustrative purposes only, and it is to be understood that changes and variations may be made without departing from the spirit or scope of the appended claims.

What is claimed is:

1. A power supply apparatus comprising:
   a plurality of power supply circuits which supply voltages to respective loads;
   a common soft start circuit which is operated when the plurality of supply voltages output from the plurality of power supply circuits are caused to make a transition simultaneously;
   an individual soft start circuit including a first terminal for outputting a predetermined fixed voltage and a second terminal outputting a voltage that varies with time, the individual soft start circuit being operated when any of the plurality of supply voltages output from the plurality of power supply circuits is caused to make a transition individually;
   a common soft start switch provided for each of the plurality of power supply circuits, the common soft start switch connecting the power supply circuit with the common soft start circuit;
   an individual soft start switch provided for each of the plurality of power supply circuits, the individual soft start switch connecting the power supply circuit with the first terminal or the second terminal of the individual soft start circuit, wherein
   the plurality of power supply circuits apply soft start control to the respective supply voltages in accordance with the soft start voltage output from the common soft start circuit or the individual soft start circuit.

2. The power supply apparatus according to claim 1, wherein the plurality of power supply circuits close the individual soft start switch in accordance with an externally supplied control signal and apply soft start control to the respective supply voltages in accordance with the soft start voltage output from the individual soft start circuit.

3. The power supply apparatus according to claim 2, wherein the plurality of power supply circuits close the common soft start switch at power-on or power-off and subject the respective supply voltages to soft start control in accordance with the soft start voltage output from the common soft start circuit.

4. The power supply apparatus according to claim 2, wherein the common soft start circuit comprises:
   a constant current source which charges a common soft start capacitor by supplying a constant current thereto; and
   a transistor which is provided parallel with the common soft start capacitor and discharges the common soft start capacitor in accordance with a timing signal input to the gate of the transistor.

5. The power supply apparatus according to claim 2, wherein the individual soft start circuit comprises:
   a latch power supply which outputs a predetermined voltage; and
   a digital-to-analog conversion circuit which outputs a voltage of a ramp waveform in accordance with a digital signal input to a digital input terminal, the output voltage at its maximum level being equal to the predetermined voltage, wherein
   the predetermined voltage is output from a first terminal and the voltage with a ramp waveform is output from a second terminal.

6. The power supply apparatus according to claim 2, wherein the individual soft start circuit comprises:
   a latch power supply which outputs a predetermined voltage;
   an individual soft start capacitor;
   a constant current source which charges the individual soft start capacitor by supplying a constant current thereto; and
   a transistor which is provided parallel with the individual soft start capacitor and discharges the individual soft start capacitor in accordance with a timing signal input to the gate of the transistor, wherein
   the predetermined voltage is output from a first terminal and a voltage at a node between the individual soft start capacitor and the constant current source is output from a second terminal.

7. The power supply apparatus according to claim 2, wherein the individual soft start circuit comprises:
   a latch power supply which outputs a predetermined voltage;
   an individual soft start capacitor;
   a resistor provided between the individual soft start capacitor and the latch power supply; and
   a transistor which is provided parallel with the individual soft start capacitor and discharges the individual soft start capacitor in accordance with a timing signal input to the gate of the transistor, wherein the predetermined voltage is output from a first terminal and a voltage at a node between the individual soft start capacitor and the resistor is output from a second terminal.

8. The power supply apparatus according to claim 2, wherein the individual soft start circuit comprises:

a latch power supply which outputs a predetermined voltage;

an individual soft start capacitor;

a charge transistor provided between the individual soft start capacitor and the latch power supply; and a discharge transistor which is provided parallel with the individual soft start capacitor and discharges the individual soft start capacitor in accordance with a timing signal input to the gate of the discharge transistor, wherein the predetermined voltage is output from a first terminal and a voltage at a node between the individual soft start capacitor and the discharge transistor is output from a second terminal.

9. The power supply apparatus according to claim 1, wherein the plurality of power supply circuits close the common soft start switch at power-on or power-off and subject the respective supply voltages to soft start control in accordance with the soft start voltage output from the common soft start circuit.

10. The power supply apparatus according to claim 1, wherein the common soft start circuit comprises:

a constant current source which charges a common soft start capacitor by supplying a constant current thereto; and a transistor which is provided parallel with the common soft start capacitor and discharges the common soft start capacitor in accordance with a timing signal input to the gate of the transistor.

11. The power supply apparatus according to claim 1, wherein the individual soft start circuit comprises:

a latch power supply which outputs a predetermined voltage; and a digital-to-analog conversion circuit which outputs a voltage of a ramp waveform in accordance with a digital signal input to a digital input terminal, the output voltage at its maximum level being equal to the predetermined voltage, wherein the predetermined voltage is output from a first terminal and the voltage with a ramp waveform is output from a second terminal.

12. The power supply apparatus according to claim 1, wherein the individual soft start circuit comprises:

a latch power supply which outputs a predetermined voltage;

an individual soft start capacitor;

a constant current source which charges the individual soft start capacitor by supplying a constant current thereto; and a transistor which is provided parallel with the individual soft start capacitor and discharges the individual soft start capacitor in accordance with a timing signal input to the gate of the transistor, wherein the predetermined voltage is output from a first terminal and a voltage at a node between the individual soft start capacitor and the constant current source is output from a second terminal.

13. The power supply apparatus according to claim 1, wherein the individual soft start circuit comprises:

a latch power supply which outputs a predetermined voltage;

an individual soft start capacitor;

a resistor provided between the individual soft start capacitor and the latch power supply; and a transistor which is provided parallel with the individual soft start capacitor and discharges the individual soft start capacitor in accordance with a timing signal input to the gate of the transistor, wherein the predetermined voltage is output from a first terminal and a voltage at a node between the individual soft start capacitor and the resistor is output from a second terminal.

14. The power supply apparatus according to claim 1, wherein the individual soft start circuit comprises:

a latch power supply which outputs a predetermined voltage;

an individual soft start capacitor;

a charge transistor provided between the individual soft start capacitor and the latch power supply; and a discharge transistor which is provided parallel with the individual soft start capacitor and discharges the individual soft start capacitor in accordance with a timing signal input to the gate of the discharge transistor, wherein the predetermined voltage is output from a first terminal and a voltage at a node between the individual soft start capacitor and the discharge transistor is output from a second terminal.

\* \* \* \* \*